United States Patent
Eldar et al.

(10) Patent No.: US 7,549,023 B2
(45) Date of Patent: Jun. 16, 2009

(54) METHOD AND APPARATUS TO UPDATE A CACHE FOR SECURITY RECORDS

(75) Inventors: Avigdor Eldar, Jerusalem (IL); Fabian Trumper, Jerusalem (IL); Zvi Vlodavsky, Mevaseret-Zion (IL); Ariel Rosenblatt, Montreal (CA)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 10/421,581

(22) Filed: Apr. 21, 2003

(65) Prior Publication Data

US 2004/0210761 A1    Oct. 21, 2004

(51) Int. Cl.
 *G06F 12/12*   (2006.01)
(52) U.S. Cl. ............... 711/133; 711/134; 711/135
(58) Field of Classification Search ............... None
 See application file for complete search history.

(56) References Cited

U.S. PATENT DOCUMENTS

| | | | | |
|---|---|---|---|---|
| 4,928,239 | A * | 5/1990 | Baum et al. | 711/136 |
| 6,766,420 | B2 * | 7/2004 | Rawson, III | 711/133 |
| 6,785,790 | B1 * | 8/2004 | Christie et al. | 711/163 |
| 6,891,543 | B2 * | 5/2005 | Wyatt | 345/541 |
| 6,934,806 | B2 * | 8/2005 | Genduso et al. | 711/135 |
| 2002/0010798 | A1 * | 1/2002 | Ben-Shaul et al. | 709/247 |
| 2002/0133608 | A1 | 9/2002 | Godwin et al. | |
| 2002/0199020 | A1 * | 12/2002 | Trace et al. | 709/245 |
| 2006/0026425 | A1 * | 2/2006 | Douceur et al. | 713/165 |

OTHER PUBLICATIONS

Jun Xu et al., Design and Evaluation of a High-Performance ATM Firewall Switch and Its Applications, IEEE Journal On Selected Areas in Communications , vol. 17, No. 6. Jun. 1999, pp. 1-11.
Carsten Benecke, A Parallel Packet Screen for Hign Speed Networks, Feb. 1999, 1999 IEEE, pp. 1-10.
Kenneth Mason Publications, International Business Machines Corporation, A Method to Cache Packet filters to Improve Filtering Performance, vol. 462, No. 121 Oct. 2002, pp. 1-3.
Wan Chun et al."Implementing Buffering of Communication Information Using Cache Scheduling Algorithm" Published Jan. 2002.

* cited by examiner

*Primary Examiner*—Hyung S Sough
*Assistant Examiner*—Ngoc V Dinh
(74) *Attorney, Agent, or Firm*—Molly A. McCall

(57) ABSTRACT

A method, apparatus, and article for caching security records for access by a hardware offloading device are disclosed. A method for updating security record entries in a hardware table is disclosed that includes marking every security record entry in the hardware table as a replacement candidate based upon passage of a determined time interval, each security record entry having a set of security parameters. Upon receiving a packet having a security record, the hardware table is checked for a security record entry corresponding to the security record. A check is done to determine whether there is a replacement candidate in the hardware table if there is no security record entry corresponding to the security record. The security record entry containing the replacement candidate is replaced with the security record if there is a replacement candidate. Other embodiments are described.

20 Claims, 4 Drawing Sheets

```
10   Timer.expire = time_interval;
20   Timer.call = Cache.clear();

30   Foreach packet {

40       If the packet is IPSec and we have a Miss {
50           If Cache is not full and SA is not in Cache {
60               Add SA to Cache;
             }
         }
}
```

Fig. 4

METHOD AND APPARATUS TO UPDATE A CACHE FOR SECURITY RECORDS

BACKGROUND

1. Field

The disclosure relates to the field of network security, and in particular, to updating a cache for storing security records.

2. Background Information

Digital information processing devices such as computers, routers, switches, network appliances, set-top boxes, and the like, which perform security related tasks may include hardware offloading devices ("HODs") to perform at least some of the security related tasks. HODs generally can reside either on a network device or as a separate device on a host. One advantage of such an architecture may be to reduce the processing burden on other resources. Also, a particular hardware offloading device may be designed to do certain tasks more efficiently.

The performance of some security related tasks may involve a security record. A security record is a data structure which includes information that may be useful in performing certain security related tasks. For example, the IPSEC protocol (defined as of 2003 in IETF RFC1825 and RFC2401, et al., but continually evolving), uses security associations (SAs). A security association (SA) is a set of security parameters that determines at least in part which transformation is to be applied to an IPSEC packet and how it should be applied. For example, a SA may include a cryptographic key useful for performing encryption, decryption and/or authentication.

In some cases, a hardware offloading device may be less efficient unless a security record is located on or near the hardware, for example, in a hardware table. The term "cache" will be used in this patent to refer to such storage that may be located on or near the hardware. That is, if the security record is not located in the cache, the hardware offloading device may have to wait for the security record to be transferred from some other location, which may introduce a significant or unacceptable amount of delay. When the requested security record is on the hardware, it is called a "hit", and when it is not, it is called a "miss".

It may be desirable to have as many hits as possible. Moreover, it may be that the hardware table is of limited size. If so, then the efficiency of the hardware offload device may depend at least in part on which security records are actually stored in the hardware table. That is, the number of hits may depend on the method used to determine which security records will be stored in the hardware table. An improved process for determining which security records are stored on the hardware table may result in an improvement in the number of hits versus misses.

Thus, there is a need for an improved method of, and corresponding apparatus for, determining which security records are stored on or near a hardware offloading device.

BRIEF DESCRIPTION OF DRAWINGS

The subject matter of the disclosure is particularly pointed out and distinctly claimed in the concluding portion of the specification. The subject matter, however, both as to organization and method or operation, together with objects, features, and advantages thereof, may best be understood by reference to the following detailed description, when read with the accompanying drawings in which:

FIG. 4 shows pseudo-code implementing a process consistent with an embodiment of the claimed subject matter.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components, and circuits have not been described in detail so as not to obscure the claimed subject matter.

Figure 1:
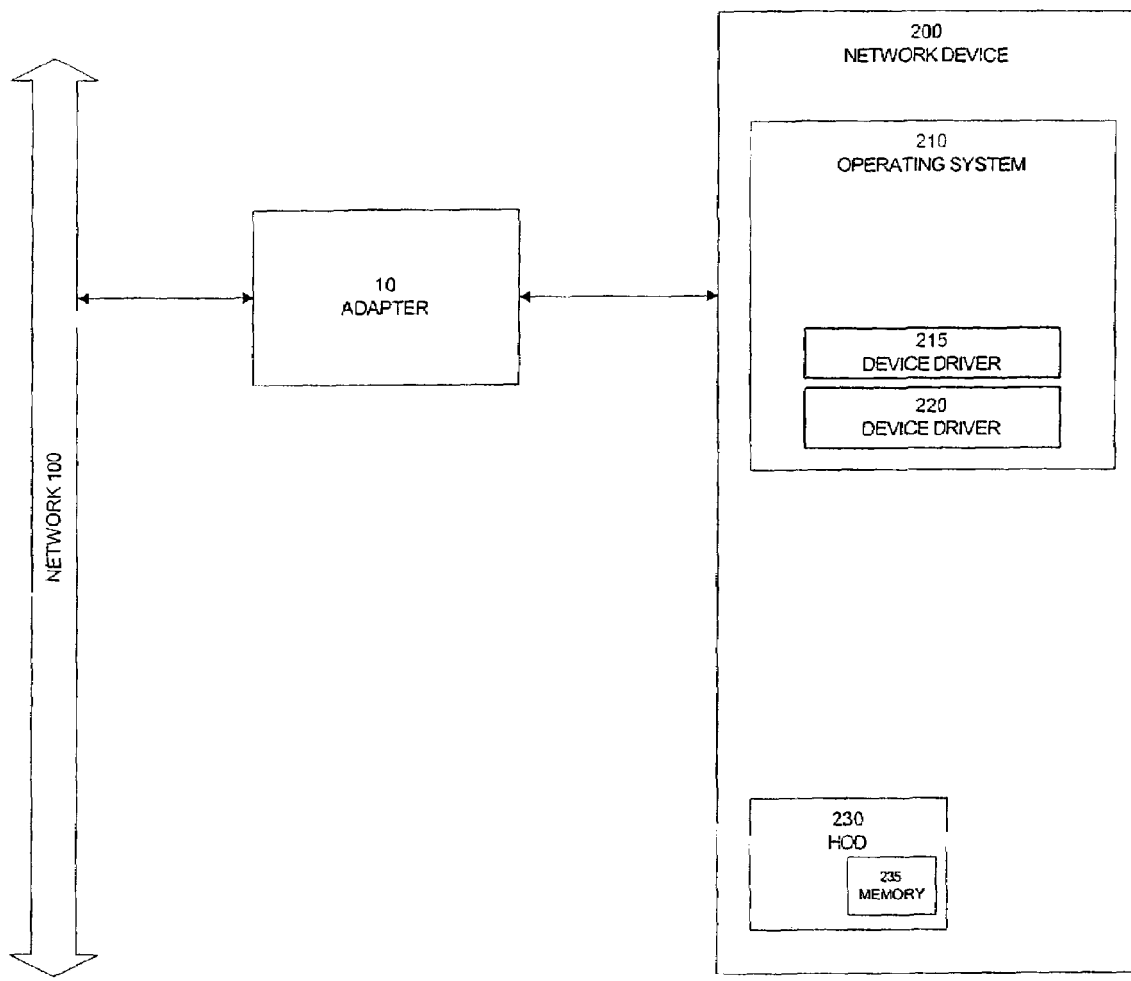
FIG. 1 is a block diagram of a host system coupled to a network consistent with an embodiment of the claimed subject matter.

FIG. 1 shows a block diagram of a host system attached to a network consistent with an embodiment of the claimed subject matter. Host system 200, which may comprise, for example, a server, here includes an operating system 210 and hardware offloading device ("HOD") 230. Operating system 210 here includes device drivers for various devices included in the system, for example, adapter 10 and hardware offloading device (HOD) 230. In this embodiment, device driver 215 is for adapter 10 and device driver 220 is for HOD 230. In addition HOD includes memory 235 (also referred to herein as a "cache"). This memory may comprise a non-volatile memory such as a ROM, EEPROM, flash memory or battery-backed RAM to permit the security records to persist even when host system 200 is not powered. Ordinary volatile memory may be appropriate if persistence is not is not a desired feature. The claimed subject matter is not limited in this respect. Also, memory 235 can be either on-chip or off-chip, so long as allotted time budgets can be met.

Packet flow through the system shown in FIG. 1 is as follows. The term "packet" is used to mean either a packet or a frame or a cell, whichever is appropriate to the particular networking technology used in an embodiment. A packet is received from network 100 through in ingress port on adapter 10. Once a packet is received off the network, it is processed. Adapter 10 may perform certain processing tasks on the packet prior to providing the packet to host system 200, which may perform further processing. The selection of which tasks are performed by the adapter and which are performed by other processing elements can vary with the architecture. The claimed subject matter is not limited in this respect.

Figure 2:
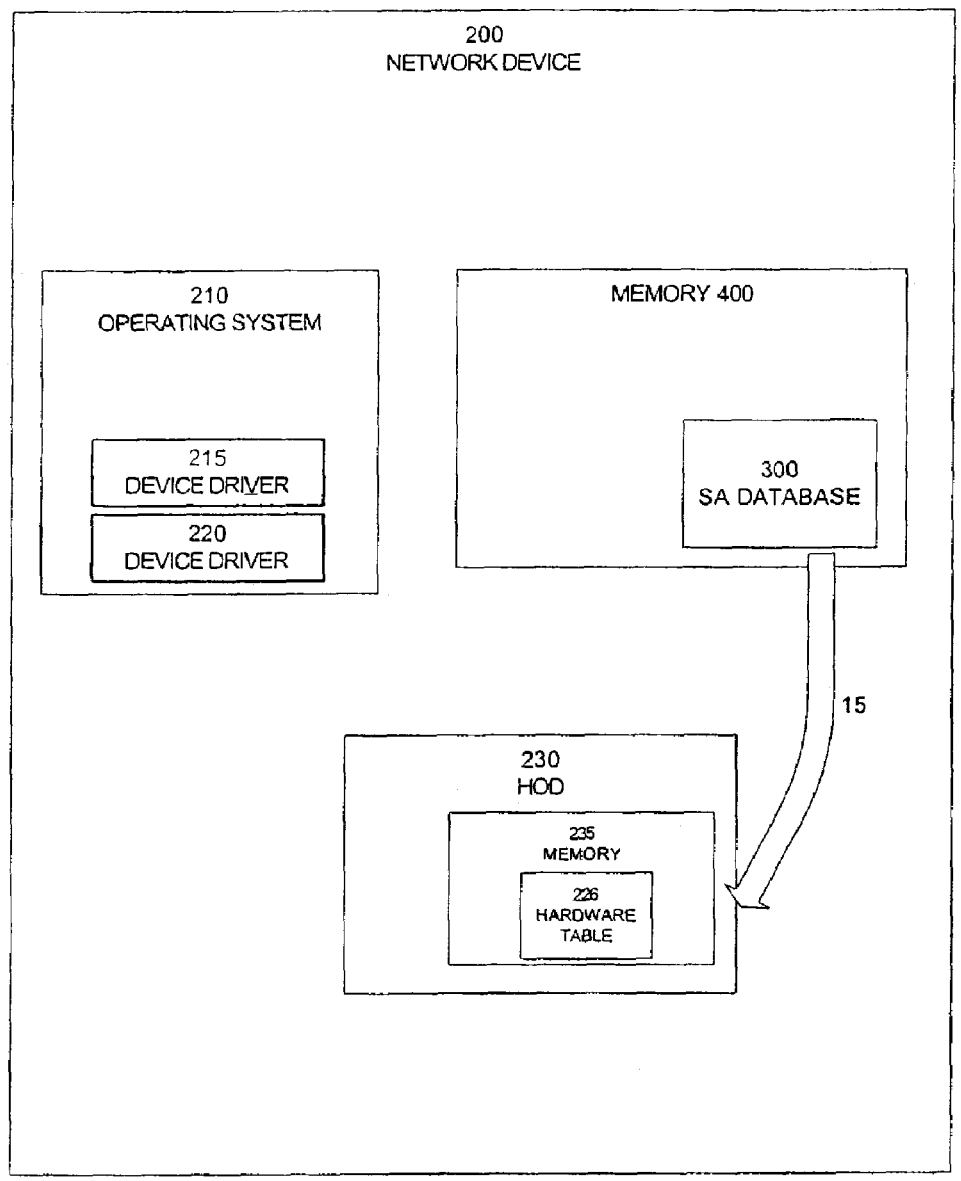
FIG. 2 is a block diagram of a host system consistent with an embodiment of the claimed subject matter.

In this embodiment, one of the processing tasks may include determining whether the packet comprises an IPSEC packet. Of course, using the IPSEC protocol is just a feature of this embodiment and is not required by the claimed subject matter. In this embodiment, this determination may be performed in host system 200. This determination may be in accordance with the RFC noted earlier, RFC 2401. Once it is determined that a packet uses IPSEC, the data which comprises a Security Association ("SA") is collected and stored for further processing. As shown in FIG. 2, host system 200, in this embodiment, includes SA database 300, stored in memory 400, which may include a large number of SAs of IPSEC packets which have flowed into host system 200.

FIG. 2 is a block diagram of a host system consistent with an embodiment of the claimed subject matter. Memory 235 on the hardware offloading device 230 here includes a hardware table 226. In one embodiment, security records used by HOD 230 are stored in hardware table 226 for fast access. Arrow 15 indicates a method, to be described below, by which HOD device driver 220 determines which of the security records stored in memory 400 may be stored in hardware table 226.

In this embodiment, IPSEC processing may be done by HOD 230. To perform encryption and decryption on a IPSEC packet, HOD 230 uses an appropriate SA. In this embodiment, HOD may check memory 235 for the SA. If the desired security association is in memory 235, it is called a "hit" and if it is not, it is called a "miss". In the case of a hit, the HOD may retrieve the SA and perform pertinent IPSEC processing, e.g. encryption or decryption. In this embodiment, in the case of a miss, HOD 230 typically will not be able to process the IPSEC packet within an allotted time budget.

Figure 3:
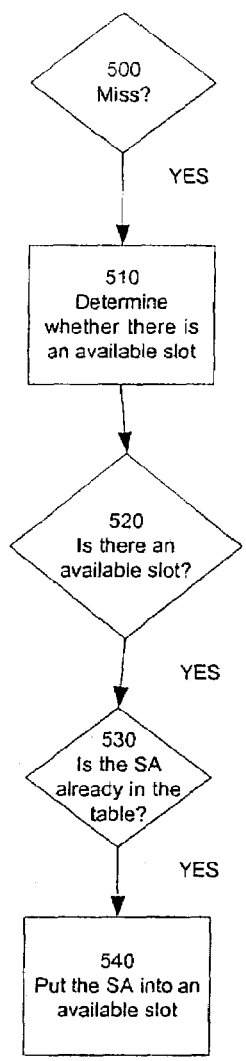
FIG. 3 is a flow chart showing the operations consistent with those occurring in one embodiment of the claimed subject matter when there is a cache miss.

FIG. 3 is a flow chart describing what happens when there is a miss for one particular embodiment. At diamond 500, the determination is made as to whether there is a miss. If so, then it is determined whether there is an available slot in hardware table ("HT") 226 on HOD memory 235. In this embodiment, the determination as to whether a slot is an available slot is made as follows. At some interval, say every n seconds, all of the existing SAs in the HT are marked as candidates for replacement. In one embodiment, the interval is fixed. However, the claimed subject matter is not limited in this respect. For example, the interval may vary, such as where there is a recurring table refresh. In another embodiment, the interval may vary according to different network traffic conditions. In one embodiment, the replacement candidates are left in the hardware table unless there is a request for an available slot. The claimed subject matter is not limited in this respect, however, as the SAs may be deleted upon being determined to be replacement candidates, for example The approach described above in connection with embodiments of the claimed subject matter is advantageous for at least the following reason. For the most frequently used SAs not in the HT, there will be a high probability of a miss. Therefore, such an SA will be added to the HT when there is an available slot.

If there is an available slot, then, in this embodiment, it is determined at diamond 530 whether the SA is already in the table. This operation takes into account that in this embodiment the miss might be for reasons other than the SA not being in the hardware table. The claimed subject matter, however, is not limited in this respect, and in another embodiment, the SA may be added to the table without the latter determination being made. In the current embodiment, however, at block 540 if it has been determined that the SA is not already in the hardware table, then it is inserted into one of the available slots.

FIG. 4 shows pseudo-code consistent with an embodiment of the claimed subject matter, although the claimed subject matter is not limited in this respect. In line 10, the time interval is set for determining when to mark existing HT entries as replaceable. In line 20, the existing HT entries are marked as replaceable based upon passage of specified time intervals. Beginning at line 30, the per packet processing is shown. At line 40, if it is determined that the packet is IPSEC and there is a miss, then line 50 is executed. At line 50, if the cache is not full (e.g. if there is at least one replaceable slot), and the SA is not already in the cache, then line 60 is executed. That is, the SA is added to the cache.

While certain features of the claimed subject matter have been illustrated and described herein, many modifications, substitutions, changes and equivalents will now occur to those skilled in the art. For example, an off-chip cache can be used instead of an on-chip cache, so long as the access times are sufficiently short. It is, therefore, to be understood, that the appended claims are intended to cover all such modifications and changes.

What is claimed is:

1. A method for updating security record entries in a hardware table, comprising:
   marking every security record entry in the hardware table as a replacement candidate based upon passage of a determined time interval, each security record entry having a set of security parameters;
   upon receiving a packet having a security record, checking the hardware table for a security record entry corresponding to the security record;
   checking to determine whether there is a replacement candidate in the hardware table if there is no security record entry corresponding to the security record; and
   replacing the security record entry containing the replacement candidate with the security record if there is a replacement candidate.

2. The method of claim 1 wherein the security records comprise IPSEC security associations.

3. The method of claim 1, wherein the determined time interval comprises every N seconds.

4. The method of claim 3, wherein N dynamically varies according to network traffic patterns.

5. The method of claim 1 wherein a security record entry which is a replacement candidate is not deleted unless there is a request to store another security record in that slot.

6. An apparatus comprising:
   a hardware offloading device and a cache with slots to store security records; and
   wherein after a security record miss and if there is an available slot, the apparatus is configured to store the missed security record in an available slot and wherein each security record entry in the cache is marked a replacement candidate based upon passage of a determined time interval.

7. The apparatus of claim 6 wherein the apparatus is further configured so that at least one slot becomes recurrently available.

8. The apparatus of claim 7 wherein the apparatus is further configured so that a time interval of recurrence dynamically varies according to network traffic patterns.

9. The apparatus of claim 6 wherein the apparatus is further configured so that a security record for which there was a miss is added to the cache only if the security record is not already in the cache.

10. The apparatus of claim 6 wherein the apparatus is further configured so that security records comprise IPSEC security associations.

11. The apparatus of claim 6 wherein the apparatus is further configured so that an available security record entry is not deleted unless the slot is requested to store another security record.

12. An article comprising a storage medium that stores instructions which when executed result in:
   marking each security record entry in a hardware table as a replacement candidate based upon passage of a determined time interval, each security record entry having a set of security parameters;
   upon receiving a packet having a security record, checking the hardware table for a security record entry corresponding to the security record;
   checking whether there is a replacement candidate if there is no security record entry corresponding to the security record; and adding the security record to the cache if there is a replacement candidate.

13. The article of claim 12 wherein the security records are IPSEC security associations.

14. The article of claim 12 wherein security record entries are marked replacement candidates at a time intervals which dynamically varies according to different network traffic patterns.

15. The article of claim 12 wherein a security record entry which is a replacement candidate is not deleted unless slot is requested to store another security record.

16. An apparatus comprising:
a hardware offloading device;
a memory associated with the hardware offloading device, wherein the memory includes a hardware table; and
a device driver is configured to:
mark every security record entry in the hardware table as a replacement candidate based upon passage of a determined time intervals, each security record entry having a set of security parameters;
upon receiving a packet having a security record, check the hardware table for a security record entry corresponding to the security record;
checking to determine whether there is a replacement candidate in the hardware table if there is no security record entry corresponding to the security record;
replacing the security record entry containing the replacement candidate with the security record if there is a replacement candidate.

17. The apparatus of claim 16, wherein the security records comprise IPSEC security associations.

18. The apparatus of claim 16, wherein the determined time interval comprises every N seconds.

19. The apparatus of claim 18, wherein N dynamically varies according to network traffic patterns.

20. The apparatus of claim 16, wherein a security record entry which is a replacement candidate is not deleted unless there is a request to store another security record in that slot.

* * * * *